United States Patent [19]

Lee

[11] Patent Number: 5,157,721

[45] Date of Patent: Oct. 20, 1992

[54] CONTROL CIRCUIT FOR AN ELECTRICAL TELEPHONE ACCESSORY

[76] Inventor: Paul Lee, 2F, No. 40, Liang-Chou St., Taipei City, Taiwan

[21] Appl. No.: 629,225

[22] Filed: Dec. 18, 1990

[51] Int. Cl.$^5$ .............................................. H04M 1/00
[52] U.S. Cl. ................................... 379/376; 379/377; 379/396; 379/442
[58] Field of Search ............... 379/372, 373, 376, 396, 379/387, 441, 442, 377; 307/250

[56] References Cited

U.S. PATENT DOCUMENTS

| | | | |
|---|---|---|---|
| 4,426,564 | 1/1984 | Steigerwald et al. | 307/250 |
| 4,747,133 | 5/1988 | Valenzona et al. | 379/376 |
| 4,951,311 | 8/1990 | Sterr | 379/376 |
| 5,087,906 | 2/1992 | Eaton et al. | 379/376 |

FOREIGN PATENT DOCUMENTS

83/03037 9/1983 PCT Int'l Appl. .
1416547 12/1975 United Kingdom .

Primary Examiner—James L. Dwyer
Assistant Examiner—Jhancy Augustus

[57] ABSTRACT

A control circuit for an electrical telephone accessory detects if the telephone receiver is on the cradle, the telephone ringer is actuated, or if the telephone receiver is lifted from the cradle. The control circuit connects the electrical telephone accessory to a power supply source when the telephone ringer is actuated or when the telephone receiver is lifted from the cradle.

3 Claims, 2 Drawing Sheets

CONTROL CIRCUIT FOR AN ELECTRICAL TELEPHONE ACCESSORY

BACKGROUND OF THE INVENTION

1. Field Of The Invention

The invention relates to control circuits, more particularly to a control circuit for an electrical telephone accessory.

2. Description Of The Related Art

Most telephone sets do not have provisions for sending out visible signals whenever an incoming call is received (i.e., the telephone ringer of the telephone set is actuated). This makes it difficult for a person to pinpoint the exact location of the telephone in places where lighting is insufficient.

SUMMARY OF THE INVENTION

Therefore, the objective of the present invention is to provide a control circuit for an electrical telephone accessory, such as a light bulb of a telephone status indicator, which is actuated whenever an incoming call is received or when the telephone receiver is lifted from the cradle.

Accordingly, a control circuit of the present invention comprises means for detecting if the voltage across a telephone line is an on-hook voltage signal (i.e., the telephone receiver is on the cradle), a ringing voltage signal (i.e., the telephone ringer is actuated), or a busy line voltage signal (i.e., the telephone receiver is lifted from the cradle); a power supply means; and means for electrically connecting the power supply means to the electrical telephone accessory when the voltage across the telephone line is either the ringing voltage signal or the busy line voltage signal. The connecting means includes a first transistor means electrically connecting the power supply means to the electrical telephone accessory when the first transistor means is in a conducting state, and means for actuating the first transistor means to conduct when the voltage across the telephone line is either the ringing voltage signal or the busy line voltage signal. The first transistor means includes a charging network to permit the first transistor means to conduct for a predetermined period when the voltage across the telephone line is the on-hook voltage signal. This permits continued operation of the electrical telephone accessory for a short period of time after the telephone receiver is replaced on the cradle.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
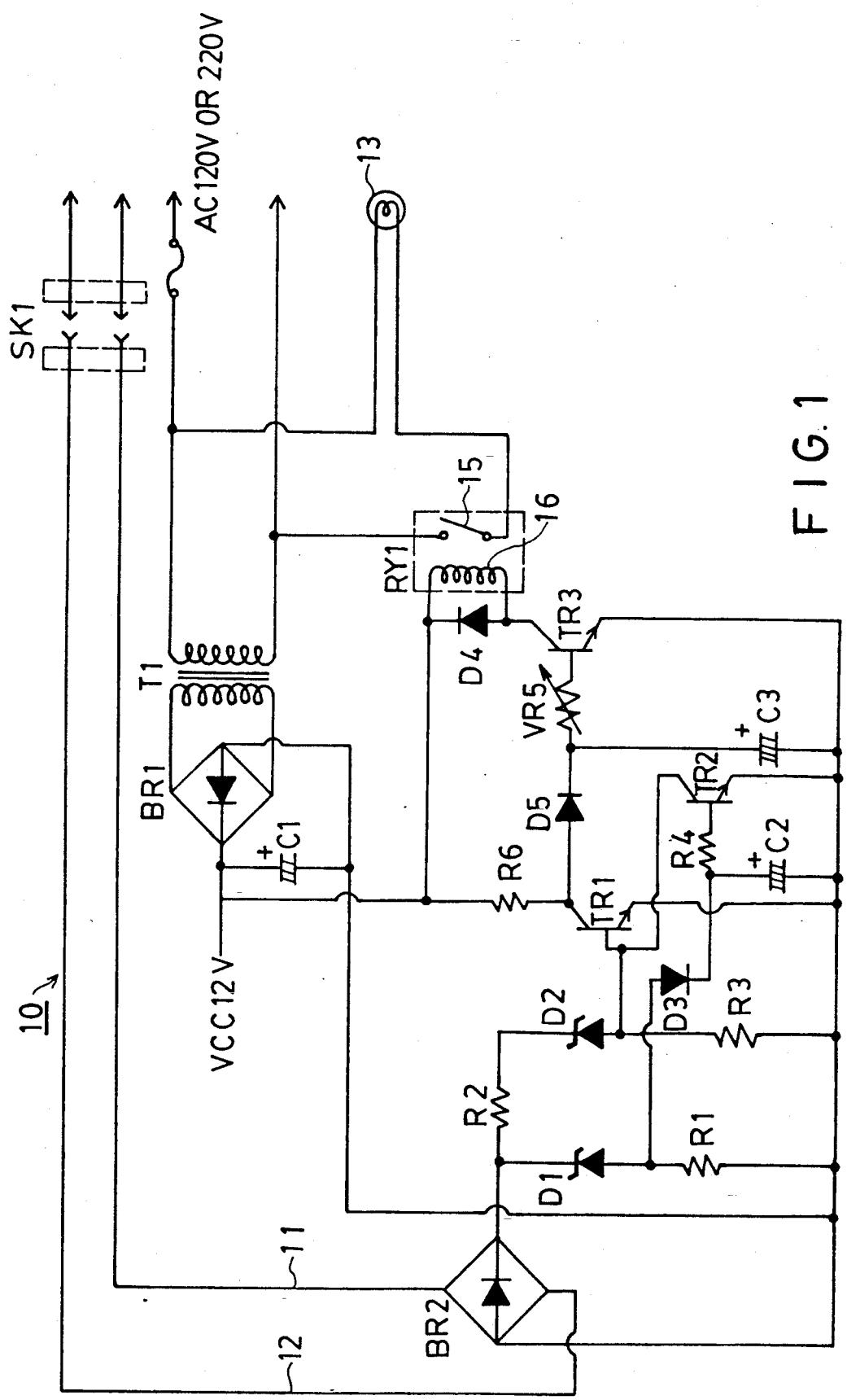
FIG. 1 is a schematic circuit diagram of the preferred embodiment of a control circuit for an electrical telephone accessory according to the present invention.

FIG. 1 is a schematic circuit diagram illustrating the preferred embodiment of a control circuit 10 for an electrical telephone accessory, such as a status indicator means 13. The control circuit 10 has conducting wires 11 and 12 to be connected to the telephone line. The voltage across the conducting wires 11 and 12 passes through a bridge rectifier circuit BR2. Electric power coming from a 110-volt or 220-volt electric outlet is applied to the primary winding of a transformer T1. The secondary winding of the transformer T1 is connected to a bridge rectifier circuit BR1. The output of the bridge rectifier circuit BR1 charges a capacitor C1 to provide a dc voltage output of approximately 12 volts. A status indicator means 13, such as a light bulb, serves as the load for the control circuit 10. One terminal end of the status indicator means 13 is directly connected to the primary winding of the transformer T1. The other terminal end of the status indicator means 13 is connected to the primary winding of the transformer T1 via a normal-open switch 15 of a relay RY1.

The base terminal of an NPN transistor TR1 is connected to the bridge rectifier circuit BR2 by means of resistors R2 and R3, and a 15-volt zener diode D2. The base terminal of another NPN transistor TR2 is similarly connected to the bridge rectifier circuit BR2 by means of a 70-volt zener diode D1, a resistor R1, a diode D4 and a charging network including a capacitor C2 and a resistor R4. The collector and emitter terminals of the transistor TR2 are respectively connected to the base and emitter terminals of the transistor TR1. The 12 volts dc voltage is applied to the collector terminal of the transistor TR1 via a resistor R6. The collector terminal of the transistor TR1 is connected to the base terminal of a third NPN transistor TR3 via a diode D5 and a second charging network including a potentiometer VR5 and a capacitor C3. The collector terminal of the transistor TR3 is connected to the coil 16 of the relay RY1 and to the anode of a diode D4 connected across the coil 16.

A voltage signal measured across the conducting wires 11 and 12 and at the output of the bridge rectifier circuit BR2 corresponds to the status of the telephone line. When the telephone receiver is on-hook, a voltage signal of approximately 40–48 volts is present across the telephone line. When the telephone ringer is actuated, a ringing voltage of approximately 90 volts is present across the telephone line. When the telephone receiver is lifted from the cradle, a busy line voltage of approximately 7 volts is present across the telephone line.

When the voltage on the telephone line is the on-hook voltage, the zener diode D2 is in a conducting state since the voltage output of the bridge rectifier circuit BR2 is greater than the breakdown voltage thereof. A sufficient bias voltage is generated across the base and emitter terminals of the transistor TR1 to thereby cause it to conduct. The voltage across the collector and emitter of the transistor TR1 is insufficient to drive the transistor TR3 into conduction. No current flows through the coil 16 of the relay RY1, and the normal-open switch 15 is in an open position. Power supply to the status indicator means 13 is thus cut off. No current flows through the zener diode D1 since the on-hook voltage is less than the breakdown voltage thereof. The transistor TR2 is thus in a non-conducting state since no bias voltage is generated at the base terminal thereof.

When the ringing voltage is present across the telephone line, the zener diode D1 is in a conducting state since the voltage output of the bridge rectifier circuit BR2 is greater than the breakdown voltage thereof. The capacitor C2 is charged via the diode D3, and a sufficient bias voltage is generated across the base and emitter terminals of the transistor TR2 to thereby cause it to conduct. Current flowing through the zener diode D2 passes through the collector terminal of the transistor TR2 instead of the base terminal of the transistor TR1. Thus, the transistor TR1 is not conducting at this stage. When the transistor TR1 is in the cut-off condition, the capacitor C3 is charged via the resistor R6 and the diode D5. When the capacitor C3 has been charged to a sufficient bias voltage, the transistor TR3 starts to conduct. Current flows through the coil 16 of the relay RY1 to energize the same and move the normal-open switch 15 to the closed position. Current then flows through the status indicator means 13 to cause the operation thereof. The status indicator means 13 is thus switched on when the ringing voltage is present across the telephone line.

The voltage across the telephone line is restored to the on-hook voltage if nobody lifts the telephone receiver when the telephone ringer is actuated. The capacitor C2 discharges through the resistor R4 and the transistor TR2. When the voltage across the capacitor C2 becomes insufficient to keep the transistor TR2 in the conducting state, the transistor TR2 returns to the cut-off condition and the transistor TR1 begins to conduct. The capacitor C3 discharges through the potentiometer VR5 and the transistor TR3 and the transistor TR3 is eventually switched off. No current flows through the coil 16 of the relay RY1 and the normal-open switch 15 moves to the open position to turn off the status indicator means 13.

When somebody lifts the telephone receiver, such as when receiving incoming calls or making outgoing calls, the voltage across the telephone line is reduced to the 7 volt busy line voltage. The transistors TR1 and TR2 are not conducting since the voltage output at the bridge rectifier BR2 is less than the breakdown voltages of the zener diodes D1 and D2. When the capacitor C3 has been charged to a sufficient bias voltage, the transistor TR3 begins to conduct and current flows through the coil 16 of the relay RY1. The normal-open switch 15 moves to the closed position and current flows through the status indicator means 13 to cause the operation thereof. When the telephone receiver is replaced, the on-hook voltage is once again present across the telephone line. The capacitor C3 once more discharges to automatically turn off the transistor TR3 and the status indicator means 13.

It is thus shown that the control circuit 10 of the present invention permits the operation of a telephone accessory, such as a status indicator, only when the telephone receiver is lifted from the cradle or when the telephone ringer is actuated.

Figure 2:
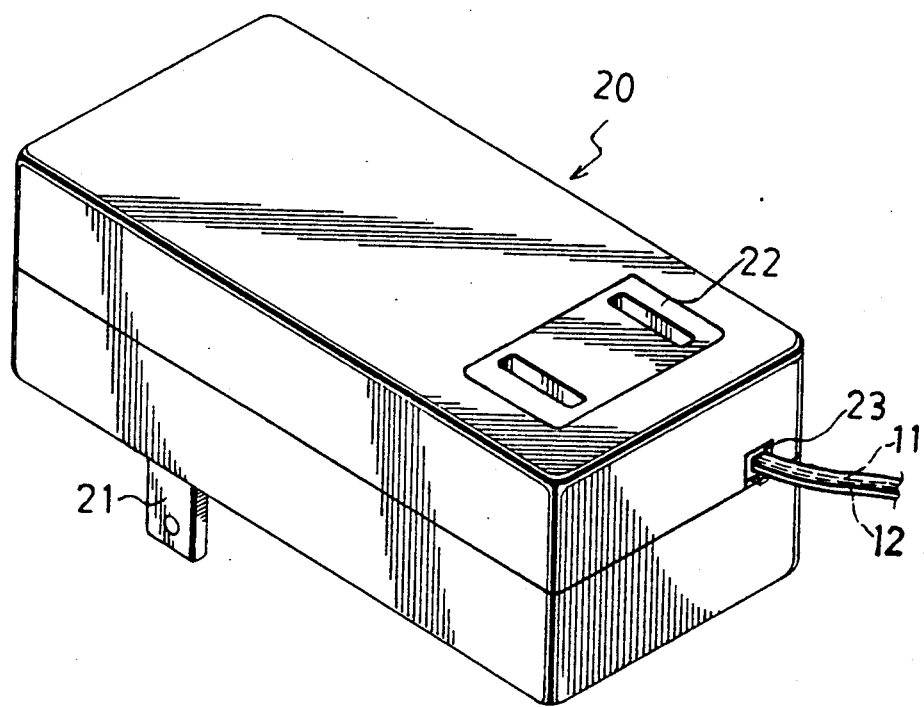
FIG. 2 is a perspective view of a housing to confine the control circuit of the present invention.

The control circuit 10 is received in a housing 20 shown in FIG. 2. The housing 20 is provided with an electrical plug means 21 to serve as a means for achieving electrical connection with a conventional electrical outlet, an electrical socket 22 to serve as a means for achieving electrical connection with the telephone accessory, and an opening 23 for the conducting wires 11 and 12.

The following is an electrical parts list for the control circuit 10 of the present invention:

T1: Transformer 240/120 V primary, 10 V secondary
BR1: 50 V, 1 A Bridge Rectifier
BR2: 400 V, 1 A Bridge Rectifier
C1: 330 micro F, 16 V
C2: 3.3 micro F, 16 V
C3: 220 micro F, 16 V
D1: 70 V zener diode ½ W
D2: 15 V zener diode ½ W
D3, D4, D5: IN4148 diode
R1, R3: 10 K, ¼ W
R2, R5: 150 K, ¼ W
R4: 560 K, ¼ W
R6: 3.3 K, ¼ W
TR1, TR2, TR3: Motorola C945 NPN transistor
RY1: 12 VDC relay While the present invention has been described in connection with what is considered the most practical and preferred embodiment, it is understood that this invention is not limited to the disclosed embodiment, but is intended to cover various arrangements included within the spirit and scope of the broadest interpretation so as to encompass all such modifications and equivalent arrangements.

I claim:

1. A control circuit of electrical telephone accessory comprising:

a pair of conducting wires electrically connecting a pair of telephone lines of a telephone to a bridge rectifier circuit for inputing voltage signal across the telephone lines into the bridge rectifier circuit in response to an on-hook voltage value when a telephone receiver is at on-hook state, a ringing voltage value when the telephone is ringing, and a busy-line voltage value when a telephone line is busy and a telephone receiver is lifted from a telephone cradle;

a power supply rectified and transformed from an utility power source;

a first transistor having a base of said first transistor electrically connected to an output of said bridge rectifier circuit through a first zener diode having a breakdown voltage of said first zener diode predetermined to be less than the on-hook voltage across the telephone lines input into and output from said bridge rectifier circuit, and having a collector and an emitter of said first transistor connected to said power supply;

a second transistor having a base thereof electrically connected to an output of said bridge rectifier circuit by a second zener diode having a breakdown voltage of said second zener diode predetermined to be smaller than the ringing voltage of the telephone lines and to be larger than the on-hook voltage of the telephone lines, and having a collector of said second transistor connected to the base of said first transistor and an emitter of said second transistor connected to a negative pole of said power supply;

a third transistor having a base electrically connected to the collector of said first transistor and a positive pole of said power supply, an emitter of said third transistor connected to a negative pole of said power supply and a collector of said third transistor connected to a first terminal of a coil of a relay having a second terminal of the coil of the relay connected to the positive pole of the power supply; and an indicator means having a first terminal of said indicator means electrically connected to a first pole of the power source and having a second terminal of said indicator means connected to a normal-open switch connected to a second pole of the power source, said normal-open switch being adjacent to said coil of said relay, and said switch operatively closed to turn on said indicator means when said third transistor is conducted;

each said first zener diode and said second zener diode having a breakdown voltage predetermined to be larger than the busy-line voltage of the telephone lines; said first transistor operatively conducted while said second transistor is switched off, and said first transistor being switch off when said second transistor is conducted;

whereby upon a normal on-hook condition when the telephone receiver is hanged on the cradle to input an on-hook voltage signal to said bridge rectifier circuit, said first transistor is conducted without conducting said third transistor and without switching on said indicator means and upon a ringing of the telephone to input a ringing voltage signal into said rectifier bridge circuit, said second transistor is conducted without conducting said first transistor, thereby increasing bias voltage of said third transistor and conducting said third transistor to energize said coil of said relay and close the switch to turn on the indicator means; and upon a lifting of the telephone receiver showing a busy telephone line, a busy-line voltage signal is input into said rectifier bridge circuit, unable for conducting both said first and said second transistors and causing a conducting of said third transistor to turn on the indicator means.

2. A control circuit of electrical telephone accessory according to claim 1, wherein a first charging network, comprised of a first capacitor and a resistor, is connected between said second transistor and said second zener diode.

3. A control circuit according to claim 1, wherein a second charging network, comprised of a second capacitor and a variable potentiometer, is connected between said third transistor and said first transistor.

* * * * *